Oct. 8, 1935.    F. S. BURNS ET AL    2,016,797
LOCK VALVE
Filed April 16, 1934
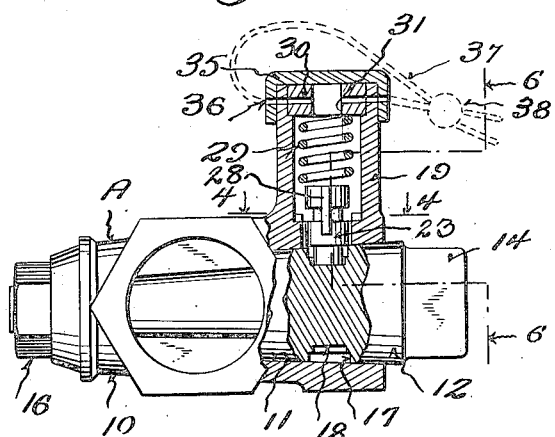
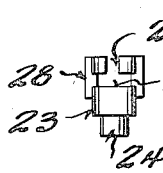 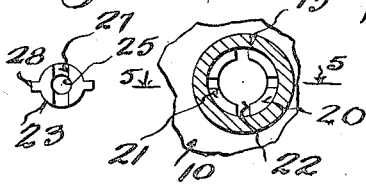 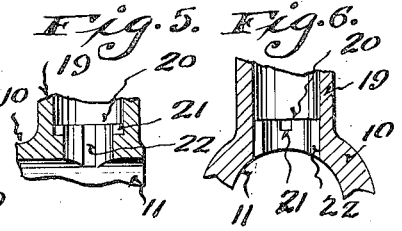
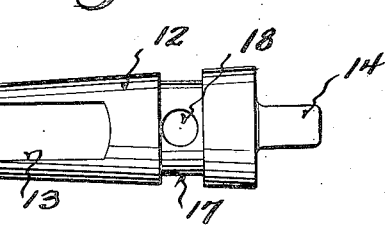
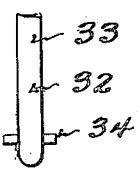 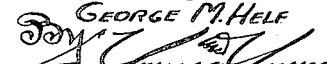
Inventors
FRANK S. BURNS
GEORGE M. HELF Patented Oct. 8, 1935

2,016,797

UNITED STATES PATENT OFFICE 2,016,797

LOCK VALVE

Frank S. Burns and George M. Helf,
Milwaukee, Wis.

Application April 16, 1934, Serial No. 720,778

2 Claims. (Cl. 16—124)

This invention appertains to valves, and more particularly to novel means for locking a valve against operation by unauthorized persons, the device being particularly adapted for use on gas supply pipes leading into homes and other buildings.

One of the salient objects of our invention is the provision of an improved valve for gas supply pipes and the like having novel means for automatically locking the valve plug against rotation, when the same is turned to its closed position, for shutting off the supply of gas, whereby the valve cannot again be turned to its open position except by persons in proper authority possessing the correct operating key.

A further important object of our invention is the provision of a novel type of locking bolt carried by a lock casing formed directly on the casing of the valve, the bolt being normally urged at all times into engagement with the valve plug, the valve plug having keeper recesses therein, so that when the plug is turned to its closed position the bolt will automatically engage the walls of the recesses to prevent unauthorized operation of the valve.

A further object of our invention is the provision of novel means for forming the locking bolt and the valve plug, whereby removal of the plug by unauthorized persons from its casing is prevented whether or not the bolt is in locking engagement with the plug.

A further object of our invention is the provision of novel means for forming the bolt, whereby the same can be readily engaged by its special key and moved to an inoperative non-locking position against the tension of its spring, so that the valve plug can be freely operated.

A further object of our invention is the provision of a removable cap associated with the valve casing for entirely closing the outer end thereof for preventing the entrance of any key or implement into the casing, the cap being held in place by a frangible seal, so that it is necessary to break the seal to remove the cap and thereby indicate that the valve has been tampered with.

A still further object of our invention is to provide an improved valve of the above character, which will be durable and efficient in use, one that will be simple and easy to manufacture, and one which can be placed on the market at a reasonable cost.

With these and other objects in view, the invention consists in the novel construction, arrangement, and formation of parts, as will be hereinafter more specifically described, claimed, and illustrated in the accompanying drawing, in which drawing:—

Figure 1 is an end elevation of our improved valve, with parts thereof broken away and in section to illustrate structural details, the valve plug being shown in its "shut off" position and held against rotation by the novel locking bolt.

Figure 2 is a detail side elevation of our improved bolt, looking at right angles from Figure 1.

Figure 3 is a top plan view of the improved locking bolt.

Figure 4 is a horizontal section taken through the lock casing on the line 4—4 of Figure 1, looking in the direction of the arrows, the lock bolt being shown removed from its casing.

Figure 5 is a detail vertical section taken on the line 5—5 of Figure 4.

Figure 6 is a detail vertical section taken at right angles to Figure 5 through the casing, the view being taken substantially on the line 6—6 of Figure 1.

Figure 7 is a side elevation of the valve plug removed from its casing.

Figure 8 is a detail fragmentary view of the key employed for actuating the lock bolt.

Referring to the drawing in detail wherein similar reference characters designate corresponding parts throughout the several views, the letter A generally indicates our improved locking valve, which embodies a valve casing 10 provided with the usual tapered valve seat, or bore, 11 for rotatably receiving the tapered valve plug 12.

The valve plug 12 is provided with the diametrically extending passageway 13 which is adapted to be moved into and out of registration with the valve inlet and outlet. One end of the valve plug 12 is provided with a polygonal head 14 for facilitating the rotation thereof by a wrench or like instrument. The opposite end of the valve plug can be provided with a threaded shank 15 for the reception of a holding nut 16.

The structure above described is conventional, and in accordance with our invention an annular groove 17 is formed in the valve plug adjacent to the polygonal head 14, and the inner wall of this groove is provided at diametrically opposite points with keeper seats, or recesses, 18, the purpose of which will be later set forth.

Formed integral with the valve casing 10, at one end thereof, is a cylindrical barrel, or lock casing, 19 which opens into the bore 11 of the valve casing. The interior diameter of the barrel, or lock casing, 19 is reduced at its inner end to provide an annular shoulder 20.

Formed at diametrically opposed points in the shoulder 20 are notches 21, and at quarters relative to the notches 21 longitudinally extending grooves 22 are provided. The notches 21 extend in parallel relation to the valve plug 12, while the longitudinal grooves 22 are disposed at right angles to the longitudinal axis of the valve plug.

Slidably mounted within the barrel, or lock casing, 19 is the novel lock bolt 23, which forms an important part of our invention. This lock bolt is of a general cylindrical shape and is provided at one end with a reduced head 24, which is adapted to ride in the annular groove 17 formed in the valve plug, and to engage in the keeper recesses 18 when the plug is in its "shut off" position.

The bolt is provided with an inwardly extending axial bore 25, and arcuate grooves 26 are formed in the opposite sides of the bolt and open into the bore. Longitudinal slots 27 are also formed in the bolt and communicate with the arcuate grooves 26 and the bore 25. Formed on the outer face of the bolt, at right angles to the slots 27, are guide ribs 28, and these ribs terminate short of the reduced head 24.

The lock bolt is normally urged toward the valve plug by means of an expansion coil spring 29 which is confined within the barrel, or lock casing, 19. The inner end of the spring bears against the outer end of the bolt, and the outer end of the spring bears against the plug 30 rigidly fitted within the outer end of the barrel. This plug 30 is provided with a keyhole 31 to permit the insertion of a key 32 into the barrel for engagement with the bolt.

The key 32 includes a longitudinally extending shank 33 having formed on one end thereof any preferred type of hand grip, and on its other end a key-bit 34 which includes radially extending, diametrically opposed arms.

When the guide ribs 28 rest in the notches 21, the bolt is held in a raised position out of the keeper recesses 18, which allows free rotation of the plug. However, the head 24 of the bolt rides in the annular groove 17 and will prevent endwise movement of the valve plug, should an attempt be made to remove the plug.

When the bolt is rotated so that the ribs 28 will ride into the slots 22, the bolt will be automatically urged by the spring 29 into either one of the keeper recesses 18 when the valve plug is turned to its closed position. This is clearly shown in Figure 1 of the drawing.

When it is desired to unlock the valve, the key 32 is inserted in the barrel 19 through the keyhole 31 in such a manner that the bit 34 will ride into the slots 27 of the bolt. As the key is rotated, the arms of the bit will ride into the arcuate grooves 26 until the arms are stopped by the ribs 28. The arms of the bit will now be firmly connected with the bolt, and hence the bolt can be pulled outwardly against the tension of its spring. This will move the bolt beyond the keeper recesses 18, and hence the valve plug can be turned to its open position. The key can now be removed.

If the valve is turned to its closed position, the bolt will automatically again be seated in one of the keeper recesses 18.

When the valve plug is turned to its closed position and is held against rotation by the bolt, the key hole 31 can be sealed so as to prevent the insertion of an operating key or any implement into the barrel without detection.

This means includes a closure cap 35 which is adapted to fit over the outer end of the barrel 19, and the cap, plug 30, and the barrel 19 can be provided with openings 36 for receiving the wire 37 of a seal 38. Obviously, to remove the cap, it is necessary to break the seal.

From the foregoing description, it can be seen that we have provided a novel and simple form of lock valve, which will be particularly useful on gas supply pipes.

Changes in details may be made without departing from the spirit or the scope of this invention, but what we claim as new is:—

1. A valve comprising a casing, a valve plug in said casing having an annular groove therein, the inner wall of said groove being provided at spaced points with keeper recesses, and a radially extending barrel formed on the casing communicating with the interior thereof, the barrel being provided with an interior annular shoulder provided with diametrically opposed notches and longitudinally extending guide grooves at right angles to the notches, and a key-operated bolt slidably mounted in the barrel, spring means normally urging the bolt toward the annular groove and the keeper recesses, the bolt having radially extending ribs adapted to seat in the notches when the bolt is in one position, and in said longitudinal grooves when the bolt is in still another position.

2. A valve comprising a casing, a rotatable valve plug in said casing having an annular groove therein, the inner wall of said groove being provided at diametrically opposed points with keeper recesses, a barrel formed on the casing and communicating with the interior thereof, the barrel being provided with an interior annular groove having formed therein diametrically opposed recesses and longitudinally extending slots at right angles to said recesses, and a key-operated bolt slidably mounted in the barrel provided with longitudinally extending ribs adapted to seat in the recesses when the bolt is in one position, and in said grooves when the bolt is in still another one of its positions, the bolt being provided with an axial bore, arcuate grooves communicating with the bore, and longitudinal slots at right angles to the ribs communicating with the bore and arcuate slots.

FRANK S. BURNS.
GEORGE M. HELF.